United States Patent [19]

Odenwald

[11] Patent Number: 5,641,918
[45] Date of Patent: Jun. 24, 1997

[54] TEST FIXTURE FOR VEHICLE DOOR LOCKS

[75] Inventor: Neill D. Odenwald, Redford, Mich.

[73] Assignee: Chrysler Corporation, Auburn Hills, Mich.

[21] Appl. No.: 584,633

[22] Filed: Jan. 11, 1996

[51] Int. Cl.$^6$ .................................................. G01N 19/00
[52] U.S. Cl. ........................................ 73/865.9; 73/862.01
[58] Field of Search ........................... 73/865.9, 862.01, 73/862

[56] References Cited

U.S. PATENT DOCUMENTS

| | | |
|---|---|---|
| 3,592,041 | 7/1971 | Spencer . |
| 4,426,179 | 1/1984 | Jefferson . |
| 4,603,894 | 8/1986 | Osenkowski ........................... 292/216 |
| 4,742,720 | 5/1988 | Storck . |
| 4,768,391 | 9/1988 | Hayes ..................................... 73/865.9 |
| 4,846,006 | 7/1989 | Thibeault ............................... 73/865.9 |
| 5,024,102 | 6/1991 | Klock et al. . |
| 5,278,547 | 1/1994 | Suman et al. ....................... 340/825.32 |
| 5,357,814 | 10/1994 | Sugiyama . |
| 5,373,749 | 12/1994 | Strand et al. . |
| 5,379,646 | 1/1995 | Andrzejak et al. ..................... 73/865.9 |
| 5,505,099 | 4/1996 | Tanaka .................................. 73/865.9 |

Primary Examiner—George M. Dombroske
Assistant Examiner—Max H. Noori
Attorney, Agent, or Firm—Roland A. Fuller, III

[57] ABSTRACT

A fixture for testing a door lock mechanism activated by the lock cylinder of a vehicle door. The fixture has a frame mounted on the door by suction cups. A ram arm has an actuating piece that is to be inserted into and removed from the key opening of the lock cylinder and the ram arm is controllably moved during a test cycle to insert the actuating piece into the lock cylinder and hold it inserted while the piece is moved up and down in the lock cylinder to simulate forced entry. The test cycle can be carried out with different controlled amounts of force.

19 Claims, 5 Drawing Sheets

TEST FIXTURE FOR VEHICLE DOOR LOCKS

BACKGROUND OF THE INVENTION

Many vehicle door locks have a cylinder in the door into which a key is inserted. Rotation of the inserted key typically moves a lever that activates the door locking mechanism. Forced entry to a vehicle is often sought to be accomplished by inserting an object, such as a rod or screwdriver, into the key opening of the lock cylinder and forcibly moving it to initiate movement of the locking lever and thereby unlock the door to permit entry.

Several countries have enacted standards that mandate a vehicle manufacturer to certify that the locking mechanism installed in vehicles manufactured or sold in the country will withstand a certain level of attempted forcible entry. For example, a number of European countries have a standard requiring that the locking mechanism must withstand insertion of a key-like object into the key opening of a lock cylinder of a locked vehicle door and the application of an inward force of 300N. While maintaining the inward force, there is to be an up-down force of 50N in a plane generally perpendicular to the inwardly applied force. The lock mechanism must withstand twenty cycles of these forces without having the lock mechanism open to permit opening of the door and access to the vehicle.

BRIEF DESCRIPTION OF THE INVENTION

The present invention relates to a test fixture used to perform tests on the lock cylinder of a door locking mechanism to simulate forcible entry. The fixture includes a mounting system, such as a plurality of suction cups, that accomplishes easy mounting of the fixture on a vehicle door. It also has a ram arm with an actuating piece at one end to be inserted into the key opening of the lock cylinder. The fixture operates the ram arm to produce a test cycle which involves applying an inward force of a controlled amount to the actuating piece while it is in the lock cylinder. With the inward force still applied, the ram arm moves the actuating piece in the cylinder by a controlled distance in an up and down direction (generally transverse to that of the inward force) with a controlled amount of force.

The fixture has a computer directed controller to actuate the test cycles and to set the amount of the forces applied in the different directions for the cycles. The controller can set the test cycles to be carried out individually, in groups, continually, etc. Monitoring apparatus is connected to the fixture to provide a record for each test cycle of the motion of the actuating arm, the forces applied, and any movement of the lock cylinder under test. A record can be printed out to demonstrate the test results and satisfaction of the standard.

OBJECTS OF THE INVENTION

It is therefore an object of the invention to provide a fixture for testing the resistance of auto door lock mechanisms to forcible entry.

Another object is to provide a fixture that is easily mountable to the door of an auto for automatically testing auto door lock cylinders and locking mechanisms.

A further object is to provide an auto door lock mechanism test fixture in which an actuating piece placed in the key opening of a door lock cylinder is controllably moved to apply forces in different directions to the lock cylinder.

Yet another object is to provide a fixture for automatically testing the ability of the lock cylinder and associated locking mechanism of an auto door to resist forces corresponding to those used in a forcible entry situation and to record the test results.

BRIEF DESCRIPTION OF THE DRAWINGS

The foregoing and other objects and advantages of the present invention will become more apparent upon reference to the following specification and annexed drawings in which.

DETAILED DESCRIPTION OF THE INVENTION

Figure 2:
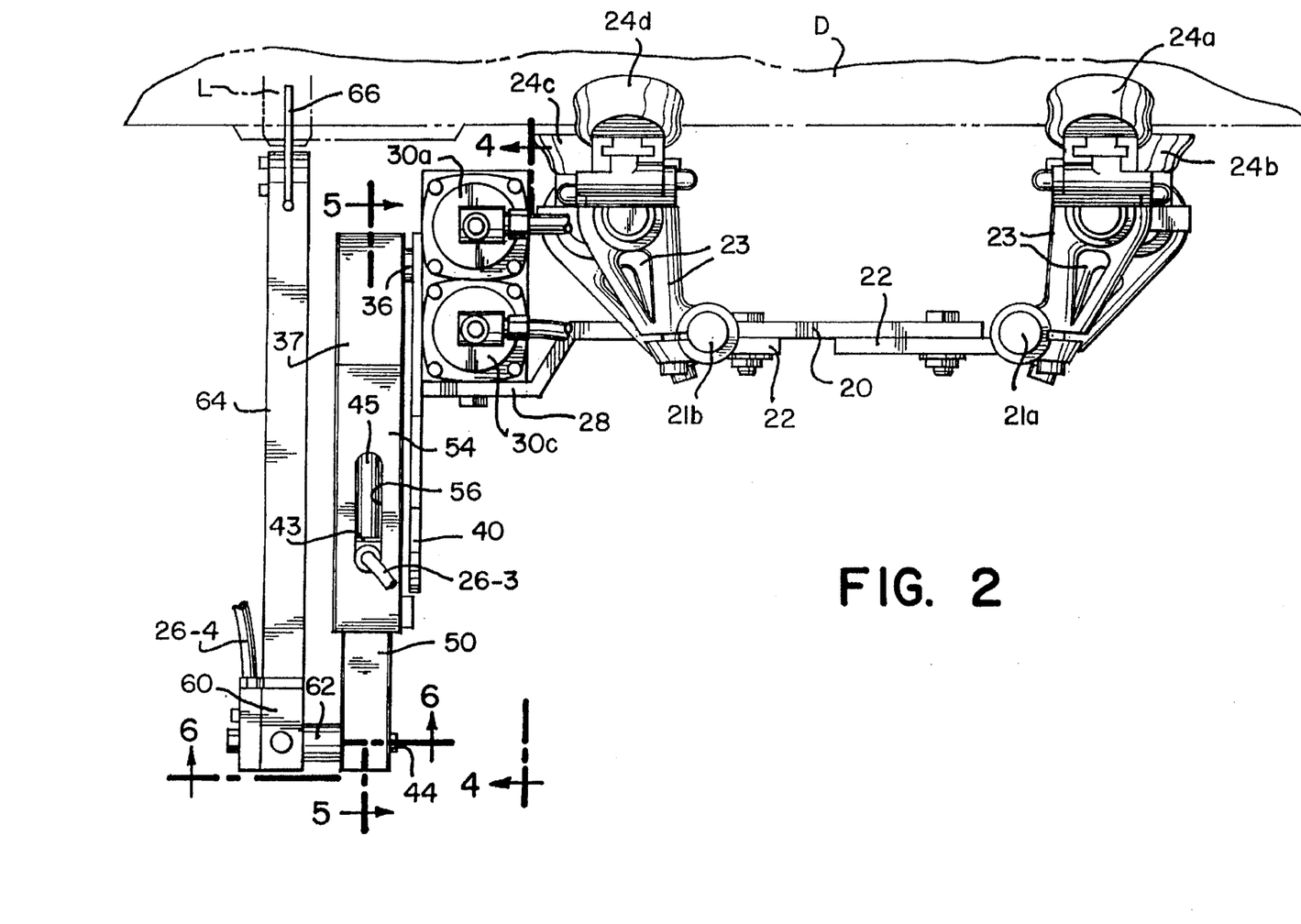
FIG. 2 is a top view relative to FIG. 1 of the test fixture.

Referring to the drawings, the test fixture 10 has a generally triangular base 20. A support arm 21a is connected by an adjustable mount 22 across the apex of the triangular base. A support arm 21b is also connected by an adjustable mount 22 on each of the corners of the triangle remote from the apex. A horizontally extending leg 23 is mounted at each end of arm 21a and to each arm 21b (FIG. 2).

A suction cup assembly 24 is mounted at the end of each leg 23 to permit the fixture 10 to be mounted on a door panel D, which is of metal or plastic, adjacent a lock cylinder L in the door. A conventional locking mechanism, not shown, is present in the door and is actuated by a key placed in the lock cylinder L. Each suction cup assembly 24, is made of flexible material, e.g., rubber, and is fastened to the door panel. Air pressure is supplied to each suction cup assembly over a respective line 26-1 connected to a controller console 14.

Fixture 10 has various cylinders, to be described, which are fluid, preferably air, operated. Console 14 contains the necessary devices, such as valves, to set the amount of air pressure to be supplied to the various components of the fixture 10. Console 14 also has electrical connections to various sensors, to be described, located on the fixture.

A programmed and programmable computer 12 controls the operation of the fixture 10 through the console 14. The computer 12 has a program that is used to set the air pressure in the various cylinders of the fixture to determine the amount of force applied, the direction of force application, the cycle time of force application, the number of cycles, and other factors. It also includes a memory for recording the operation of the fixture in terms of the number of cycles, the time of each cycle, the amount of force applied during a cycle and the test results.

Figure 1:
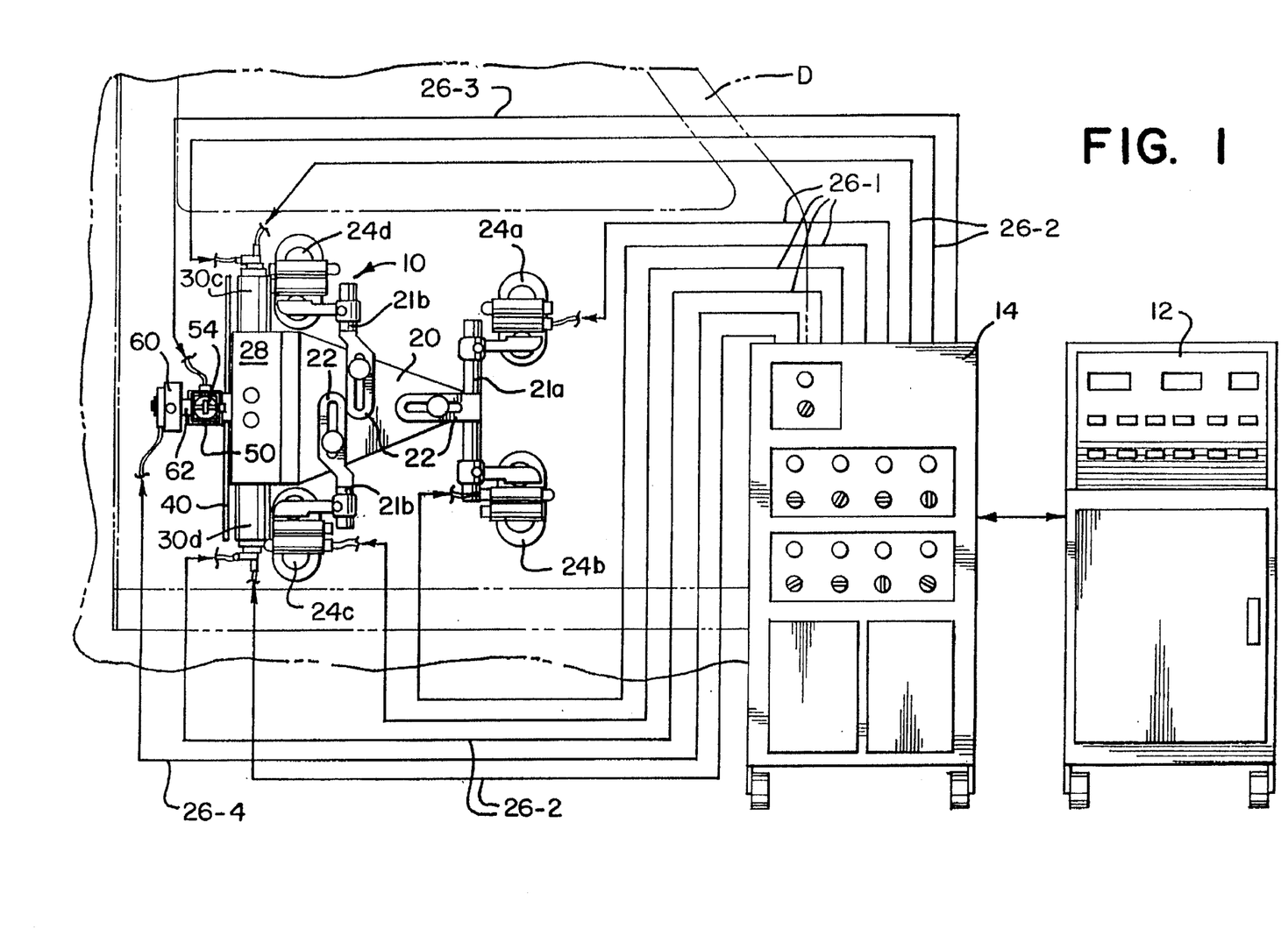
FIG. 1 is an overall view of the test fixture shown mounted on the door of an auto and its associated controller and computer.
Figure 3:
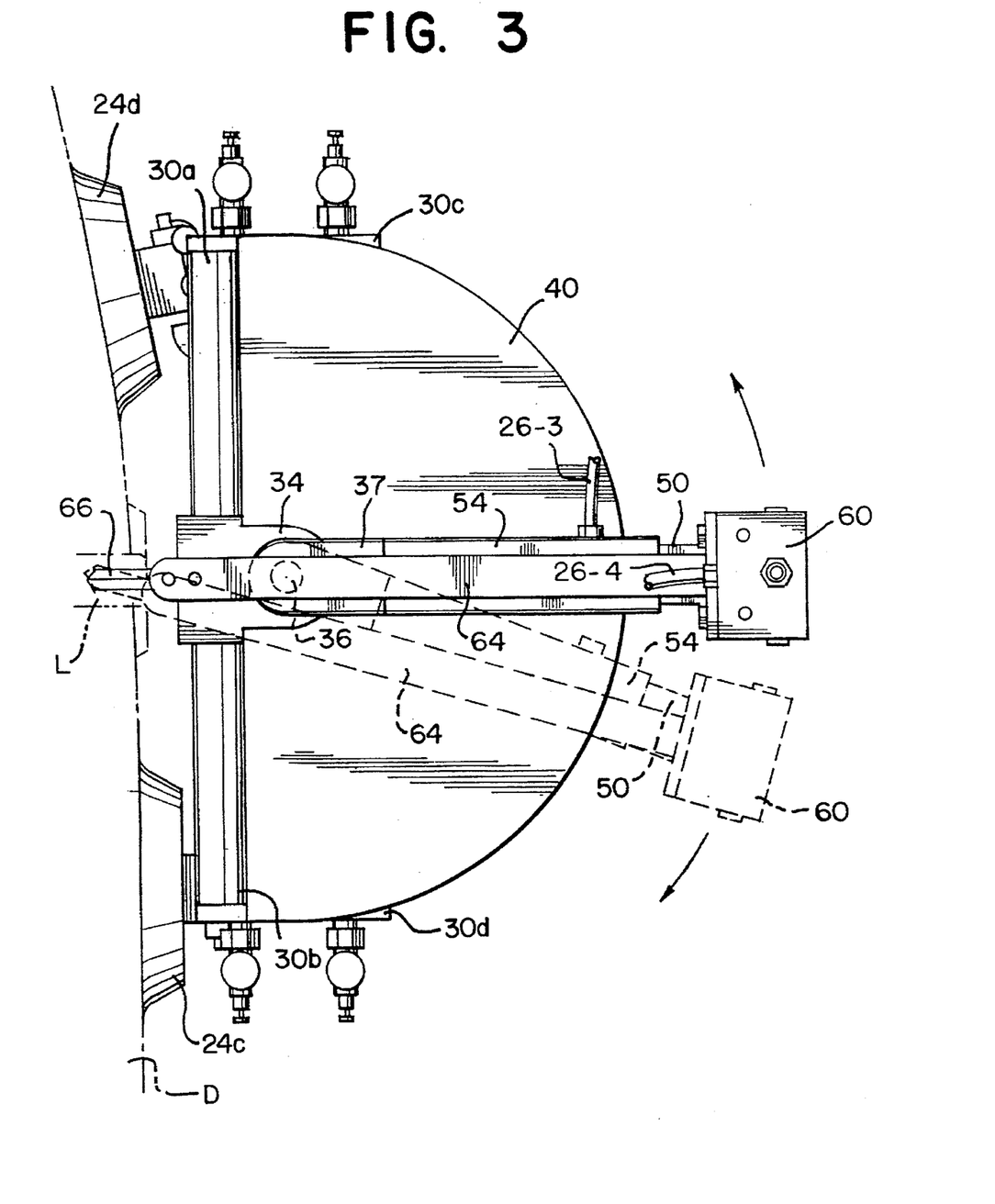
FIG. 3 is a left side view relative to FIG. 1 of the fixture.

Four air operated cylinders 30a, 30b, 30c, 30d are mounted in two stacked rows of two cylinders per row (FIGS. 1, 2 and 4) on a part 28 of the base. Each cylinder has its movable piston output end connected to a linear to rotary motion conversion mechanism mounted in a housing 34 connected to the back of a semi-circular table 40 that is attached transversely to the bracket 20. As seen in FIG. 3, table 40 is also generally transverse to door D when the fixture is mounted to the door.

Figure 6:
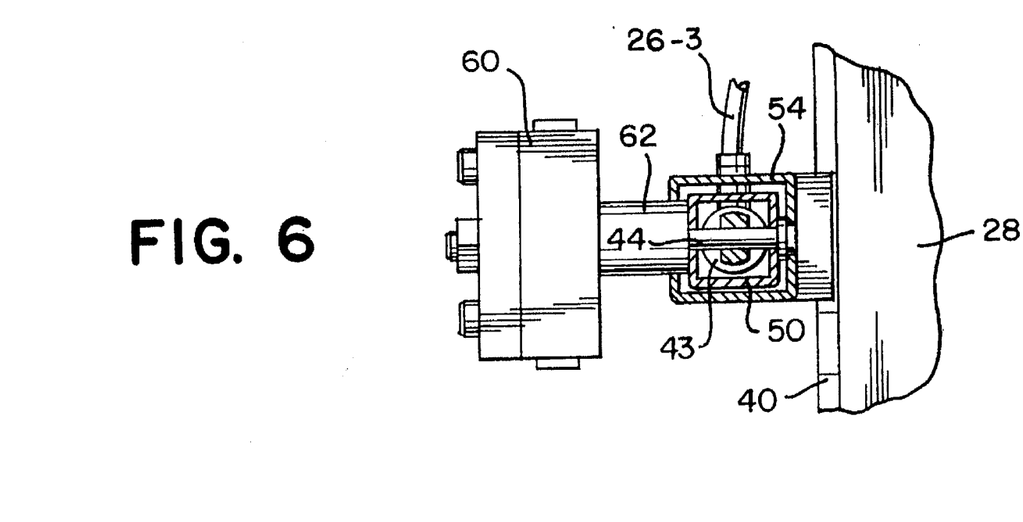
FIG. 6 is a cross-sectional view of a part of the fixture along lines 6—6 of FIG. 2.

The mechanism in housing 34 is any conventional arrangement for converting the linear motion of the pistons of the cylinders 30a, 30b, 30c and 30d to rotary motion of an output shaft 36 that extends from housing 34 through the table 40 (see FIG. 6). The motion converting mechanism can be, for example, a Model 494 made by Bimba Pneu-Turn of Bimba Manufacturing. This device has racks (not shown) which are driven by the linearly moving pistons of the cylinders 30. The racks engage a pinion gear (not shown) whose output is the rotating output shaft 36.

Figure 5:
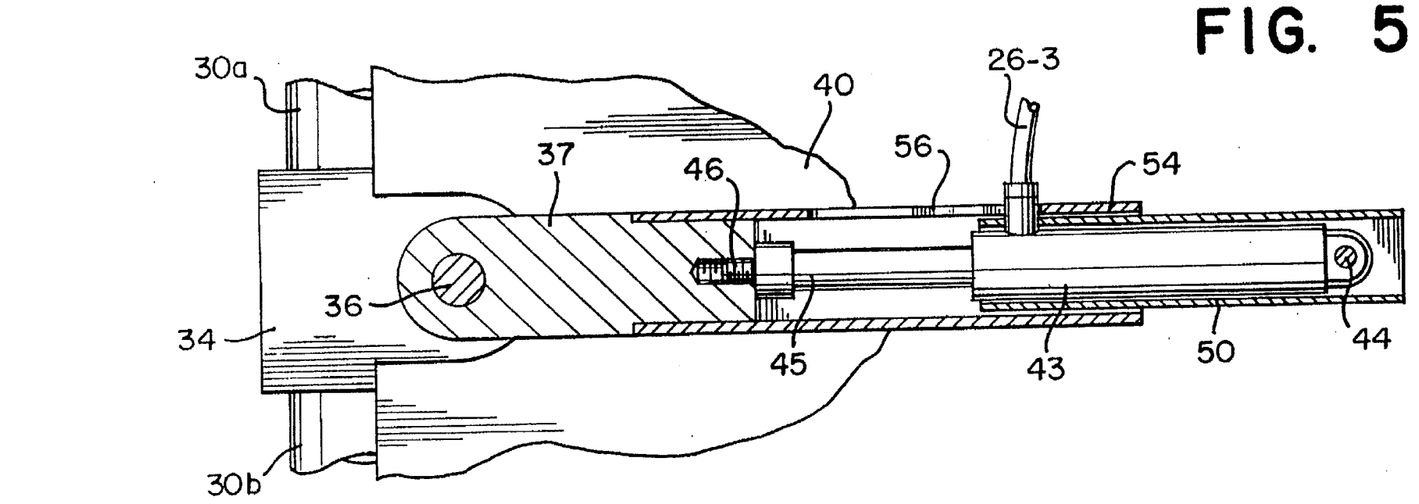
FIG. 5 is a cross-section of part of the fixture along lines 5—5 of FIG. 2.

As shown in FIGS. 5 and 6, the end of a sleeve 54 is connected to a post 37 mounted on rotatable output shaft 36. Sleeve 54 rotates with the rotation of shaft 36 over the table 40. When the fixture 10 is mounted to the door D, the rotary movement of sleeve 54 is in a plane that is transverse to the door D. The angular degree of rotation is controlled by the cylinders 30 that operate mechanism 34 to produce rotation of shaft 36.

A hollow actuating arm 50 is mounted for reciprocal motion within sleeve 54. The arm 50 in turn houses an air actuated cylinder 43 whose base end is fixed to the actuating arm 50 by a pin 44 and whose piston 45 has its end 46 fixedly screwed into post 37. The air supply tube 26-3 that feeds cylinder 43, enters through a slot 56 in the sleeve 54. As can be seen, control of air pressure to cylinder 43 causes a relative extension-retraction movement between the piston 45 and the cylinder 43. Since the end 46 of the piston 45 is fixed to post 37 and the end 44 of the cylinder 43 is fixed to arm 50, this will cause arm 50 to move in and out along the length of sleeve 54 as air pressure is applied to and removed from cylinder 43. With the fixture 10 mounted to the door D, movement of arm 50 is transverse to the plane of the door. The amount of movement of arm 50 is controlled by the amount of air supplied to cylinder 43.

A ram arm 64 (as best seen in FIG. 2) has one end 60 connected to the end of the actuating arm 50 remote from the rotating shaft 36 by a coupling piece 62. The end 60 of the ram arm has a housing that includes three pressure transducers (not shown). Line 26-4 is a multi-conductor cable to supply the output of the three transducers to the computer. At the other end of ram arm 64 is an actuating piece 66, corresponding to a key, metal blank or screwdriver, that fits in the key opening of lock cylinder L. Movement of actuating arm 50 causes a corresponding movement of the ram arm 64 and actuating piece 66 relative to the vehicle door D.

Movement of the ram arm 64 moves the actuating piece 66 into and out of the lock cylinder key opening. The transducers in the ram arm end 60 housing supply ram arm positional information back to the computer to provide record information of positioning of the ram arm and its actuating piece 66. When the ram arm actuating piece 66 is in the lock cylinder, the amount of applied inward force is controlled. Also, the actuating piece 66 can be moved up and down while located in the lock cylinder.

The operation of the test fixture is as follows. The computer 12 has a program that instructs the controller 14. This program can be modified by the operator through the computer keyboard, mouse, etc. It can also be operated to override the controller. Located within the controller is an air supply and a number of control valves operated in response to the computer program. Each of the control valves has an output line connected to a respective air cylinder, as shown. Each of four control lines 26-1 is connected to one of the suction cup assemblies 24. These usually have a constant pressure. There is a respective supply line 26-2 to each of the four cylinders 30. Further, there is a supply line 26-3 from the controller to the cylinder 43 in the actuating arm 50.

The fixture 10 is placed on the door D with the ram arm 64 retracted from the door panel so that the actuating piece 66 is directly aligned with the key opening of the door lock cylinder. The suction cup assemblies 24 are actuated to fasten the fixture to the door. The actuating arm 50, as it reciprocates within sleeve 54 due to pressure control of cylinder 43, moves the actuating arm 64 and the actuating piece in and out, i.e., transverse, to the door panel surface. This corresponds to moving a key or other entry piece in and out of the lock cylinder L.

Figure 4:
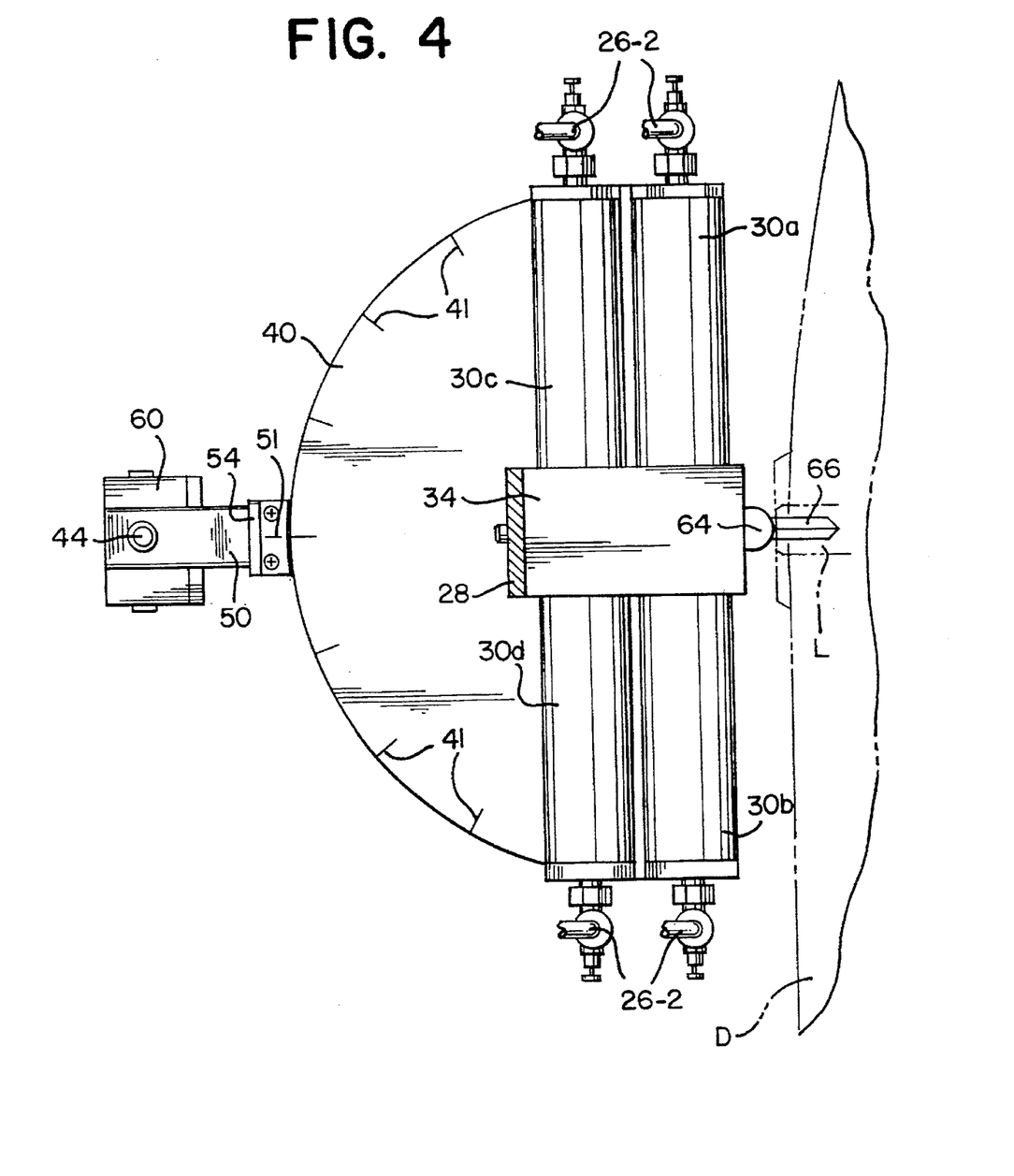
FIG. 4 is a right side view in the direction of lines 4—4 of FIG. 2.

With the actuating piece 66 in the cylinder L with an inward force being applied, control of pressure to the cylinders 30a, 30b, 30c and 30d, causes the shaft 36 and the connected actuating arm 50 to rotate relative to table 40 and to rotate ram arm 64. As seen in FIG. 3, rotation of shaft 36 causes rotation of actuating arm 50 and the connected ram arm 64 relative to table 40. Table 40 can have angular index markings 41 associated with a position marker 51 on actuating arm 50 (FIG. 4). The actuating arm 50 can be moved to a position above or below the solid line (center) position of FIG. 3, as shown by the dotted lines, by the control of pressure to the cylinders 30. In the center position, actuating arm 50 aligns the ram arm 64 actuating piece 66 with the lock cylinder. The angular rotation of shaft 36 and connected actuating arm 50 causes up and down movement of the ram arm 64 with the actuating piece 66 inserted in the lock cylinder opening. This corresponds to attempted forcible entry by a key or tool.

The test is carried out as follows. The door panel can be vertically mounted on the vehicle or it can be separate and placed at any desired angle. The fixture is attached to the door panel and remains attached by the force produced by the suction cups. The test cycles, as set by the computer and/or operator, begin. Each cycle includes the steps of:

a. retracting the actuating arm 50 inwardly toward the door so as to move the ram arm inwardly, inserting the actuating piece 66 into the key opening of lock cylinder L. The amount of the inward retraction determines the force applied to the lock cylinder by the actuating piece 66.

b. rotating the shaft 36 so as to move actuating arm 50 in an up and down direction. This reciprocates the actuating piece 66 up and down in a plane that is generally transverse to the door, as shown in FIG. 3. The up and down movement is carried out with the inward force of step a. still being applied. The amount of rotation of shaft 36 controls the degree of up and down motion of the actuating piece 66 and effectively the force applied during such up and down movement.

c. repeating step b. as many times as desired. The applied inward force and the extent of up and down motion, i.e., angular rotation of shaft 36, can be the same or different for each up and down motion of the actuating piece 66.

d. stopping the actuating arm 50 at a neutral position, i.e., with the actuating piece 66 properly aligned in the key opening of lock cylinder L.

e. extending actuating arm 54 away from door D to move the actuating piece 66 out of the lock cylinder L.

Steps a.–e. are repeated to obtain the desired number of test cycles. All of this is recorded by the computer and a record can be printed.

A switch (not shown) triggered by activation of the door lock mechanism is located either at the inside door operating handle or the finger operated push-pull latch on the window sill. The switch, which can be mechanically operated such as a microswitch or an optical switch, detects that a test cycle has caused the lock mechanism to be actuated. This signals failure of the auto lock mechanism. Actuation of the switch can trigger an alarm.

The operator views the door to see if there is a malfunction of the door lock mechanism at any time. Typically, passing the test standard requires 30 test cycles without actuation of the door lock mechanism.

While the invention has been particularly shown and described with reference to a preferred embodiment thereof, it will be understood by those skilled in the art that various changes in form and details may be made therein without departing from the spirit and scope of the invention.

I claim:

1. A test fixture for a door lock mechanism having a lock cylinder with an opening comprising:

an actuating piece of a size permitting insertion into the lock cylinder opening;

a reciprocating arm with the actuating piece at one end, said arm moving said actuating piece to insert the actuating piece into and remove it from said lock cylinder opening;

a rotary device connected to said arm, said rotary device causing said arm and attached actuating piece to move up and down while said actuating piece is in said lock cylinder opening, and a computer operatively connected with said reciprocating arm and rotary device, said computer controlling the movements of said rotary device to form an operating cycle in which the arm moves to insert the actuating piece into the lock cylinder opening, the rotary device is actuated to move the actuating piece up and down at least once while the actuating piece is in the lock cylinder opening, and the arm is moved to remove the actuating piece from the lock cylinder opening.

2. A test fixture as in claim 1 further comprising a force applicator connected to said reciprocating arm, said applicator applying a predetermined amount of force to said arm so as to hold the actuating piece in said lock cylinder opening with said predetermined force as said rotary device moves the actuating piece up and down.

3. A test fixture as in claim 2 wherein said rotary device includes a controller, said controller controls the amount of up and down movement of the actuating piece while the actuating piece is in the lock cylinder opening.

4. A test fixture as in claim 1 wherein said rotary device comprises:

a plurality of hydraulic cylinders with pistons located therein and piston rods extending therefrom;

a rotary shaft connected to said reciprocating arm, and a connection between the piston rods and the rotary shaft such that movement of the piston rods provides controlled rotation of said shaft.

5. A test fixture as in claim 1 wherein the computer actuates the rotary device to reciprocate the actuating piece up and down a predetermined number of times.

6. A test fixture as in claim 1 wherein said reciprocating arm is a ram arm having the actuating piece mounted at one end thereof, said ram arm being hydraulically operated.

7. A test fixture as in claim 6 further comprising a base frame to which said ram arm is connected, and a suction cup assembly for mounting the base frame to a surface of an object in which the lock cylinder is located.

8. A test fixture as in claim 6 further comprising a base frame, said ram arm comprises a fluid actuated cylinder and a movable piston located in the cylinder and having a piston rod extending therefrom, one of said cylinder and piston rod being connected to said base frame and the other of said cylinder and piston rod connected to said ram arm.

9. A test fixture as in claim 6 further comprising a base frame, said rotary device comprising a rotatable shaft to which a part of said ram arm remote from said actuating piece is connected.

10. A test fixture as in claim 9 further comprising a base frame, said ram arm comprising a fluid actuated cylinder and a movable piston located in the cylinder and having a piston rod extending therefrom, one of said cylinder and piston rod being connected to said base frame and the other of said cylinder and piston rod being connected to said ram arm.

11. A test fixture as in claim 10 further comprising a base frame to which said ram arm is connected, and a suction cup assembly for mounting the base frame to a surface of an object in which the lock cylinder is located.

12. A test fixture as in claim 1 further including a hydraulic console operatively connected between said computer and said reciprocating arm and said rotary device;

each of said reciprocating arm and rotary device being moved by hydraulic pressure; and said computer providing control signals to said console such that said console provides hydraulic pressure sufficient to cause controlled movement of said arm and rotary device.

13. A test fixture for a door lock mechanism having a lock cylinder with an opening comprising:

a base;

a plurality of hydraulically-operated suction cups at edges of the base, said suction cups when operated acting to mount the base to a surface of an object in which the lock cylinder is located;

a rotary shaft fastened to the base;

a plurality of hydraulic piston-cylinder assemblies with movable piston rods, said piston rods being connected to said rotary shaft to cause rotation thereof when said piston rods are moved in a controlled fashion;

a ram arm with one end connected to said rotary shaft for rotation of said ram arm therewith, said ram arm having a piston-cylinder assembly with a movable piston rod, said ram arm piston rod causing the other end of said ram arm to extend and retract when the ram arm piston rod is moved in a controlled fashion; and an actuating piece located at the other end of said ram arm, said actuating piece being of a size to permit it to be inserted into the lock cylinder opening.

14. A test fixture as in claim 13 further including:

a console having a supply of hydraulic fluid and connected to providing operating fluid pressure to said suction cups to attach the base to the object, to said plurality of piston-cylinder assemblies to cause said ram arm to rotate and to said ram arm piston-cylinder assembly to cause said ram arm to extend and retract; and a computer operatively connected to said console to provide control signals to said console such that said console provides fluid pressure to cause controlled movement of said ram arm in a cycle that includes movement of the arm to insert the actuating piece into the lock cylinder opening, rotation of the arm to move the actuating piece up and down at least once while the actuating piece is in the lock cylinder opening, and movement of the arm to remove the actuating piece from the lock cylinder opening.

15. A test fixture as in claim 14 wherein the computer actuates the ram arm to reciprocate the actuating piece up and down a predetermined number of times in a cycle.

16. A test fixture as in claim 13 wherein said ram arm comprises:

a first arm with one end fasten to said rotary shaft, said rotary shaft being generally parallel to said object containing the door lock mechanism, said first arm extending in a direction away from and generally perpendicular to the object;

a second arm extending toward the object and being generally parallel to the first arm, said second arm being fastened to the first arm at the ends remote from the object, the other end of the second arm supporting the actuating piece; and hydraulic piston-cylinder assemblies being located in each of said first and second arms.

17. A test fixture for a door lock mechanism having a lock cylinder with an opening comprising:

an actuating piece for insertion into the lock cylinder opening;

means for moving said actuating piece to insert the actuating piece into and remove it from said lock cylinder opening;

means for reciprocating said actuating piece up and down while in said lock cylinder opening, and a controller for repeating the cycle of actuating the moving means to insert the actuating piece into the lock cylinder opening, actuating the reciprocating means to move the actuating piece up and down while in the lock cylinder opening, and actuating the moving means to remove the actuating piece from the lock cylinder opening.

18. A test fixture as in claim 17 further comprising means for holding said moving means with the actuating piece in said lock cylinder opening with a predetermined amount of force as said means for reciprocating reciprocates the actuating piece up and down.

19. A test fixture as in claim 18 wherein said means for reciprocating includes means for controlling the distance of up and down movement of the actuating piece while in the lock cylinder opening.

* * * * *

UNITED STATES PATENT AND TRADEMARK OFFICE
CERTIFICATE OF CORRECTION

PATENT NO. : 5,641,918
DATED : June 24, 1997
INVENTOR(S) : Odenwald

It is certified that error appears in the above-indentified patent and that said Letters Patent is hereby corrected as shown below:

On the title page, item [75], change inventor's middle initial from "D" to --T--.

Signed and Sealed this

Fourth Day of August, 1998

Attest:

Attesting Officer

BRUCE LEHMAN

Commissioner of Patents and Trademarks